Nov. 23, 1965　　AKIRA YOSHIHARA ETAL　　3,218,995
SLUDGE DRYING AND INCINERATION APPARATUS FOR
INDUSTRIAL WASTE-WATER TREATMENT
Filed Jan. 21, 1963
9 Sheets-Sheet 1

FIG. 10

United States Patent Office 3,218,995
Patented Nov. 23, 1965

3,218,995
SLUDGE DRYING AND INCINERATION APPARATUS FOR INDUSTRIAL WASTE-WATER TREATMENT
Akira Yoshihara, Tsutomu Yoshihara, Kenji Okada, and Shigeharu Sakaguchi, all of Tokyo, Japan (all % Glascock, Downing and Seebold, National Press Bldg., Washington, D.C.)
Filed Jan. 21, 1963, Ser. No. 252,818
Claims priority, application Japan, Jan. 26, 1962, 37/2,187
6 Claims. (Cl. 110—7)

This invention relates to a sludge drying and incineration apparatus for the treatment of industrial waste waters in pulp plants, woolen mills, chemical dye factories, etc.

The so-called sludge cake produced by settling-tank concentration and the natural drying or vacuum rapid coagulation of sludge formed in the chemical decolorization and purification of colored waste water in a pulp plant, a woolen mill, a chemical dye factory, or the like contains 60 to 80% water, and sludge cake containing 30 to 50% of waste water in this state is combustible and the fuel value thereof is 1200 to 2000 Kcal./kg.

This invention provides an excellent, integrated apparatus for the heat-drying and incineration of water-containing sludge cake and in which apparatus the above-mentioned fuel value is most effectively available for the heat-drying, with auxiliary heat supplied by adding heavy oil, bark, wood meal, coal dust or the like fuel in accordance with the conditions of each factory producing waste-water to be treated, with metal oxides, reduced iron and the like in the resulting ash being easily recovered and re-used as purifying agents, and a high performance such as 75% thermal efficiency being attainable.

The apparatus according to the present invention is characterized by the combination of a drier and an incinerator, the drier being a horizontal rotary multivane drier or a vertical multistep stirring drier, either of which can be combined with the incinerator which is a vertical furnace having a polygonal multi-umbrella type rotary hearth, and the ash produced by incineration may automatically be carried out of the furnace. The accessories of the drier are a sludge feed device, an exhaust blower, a flue and a dust catcher, and the accessories of the incinerator are a blower, a screw conveyor for ash discharge, an ash lump screen, and a heavy oil burning device or a feed device for auxiliary fuels such as bark, wood metal, or coal dust. An automatic operation of these accessories is also possible. Further, the incineration is designed to keep its inner temperature below approximately 1000° C. under the necessity of preventing too high a temperature.

Further objects and advantages of the invention will become more readily apparent to one skilled in the art from the following detailed specification and annexed drawings of an embodiment of the invention, and in which drawings.

The features of the present invention will become more apparent from the following detailed description taken in connection with the accompanying drawings.

Figure 1:
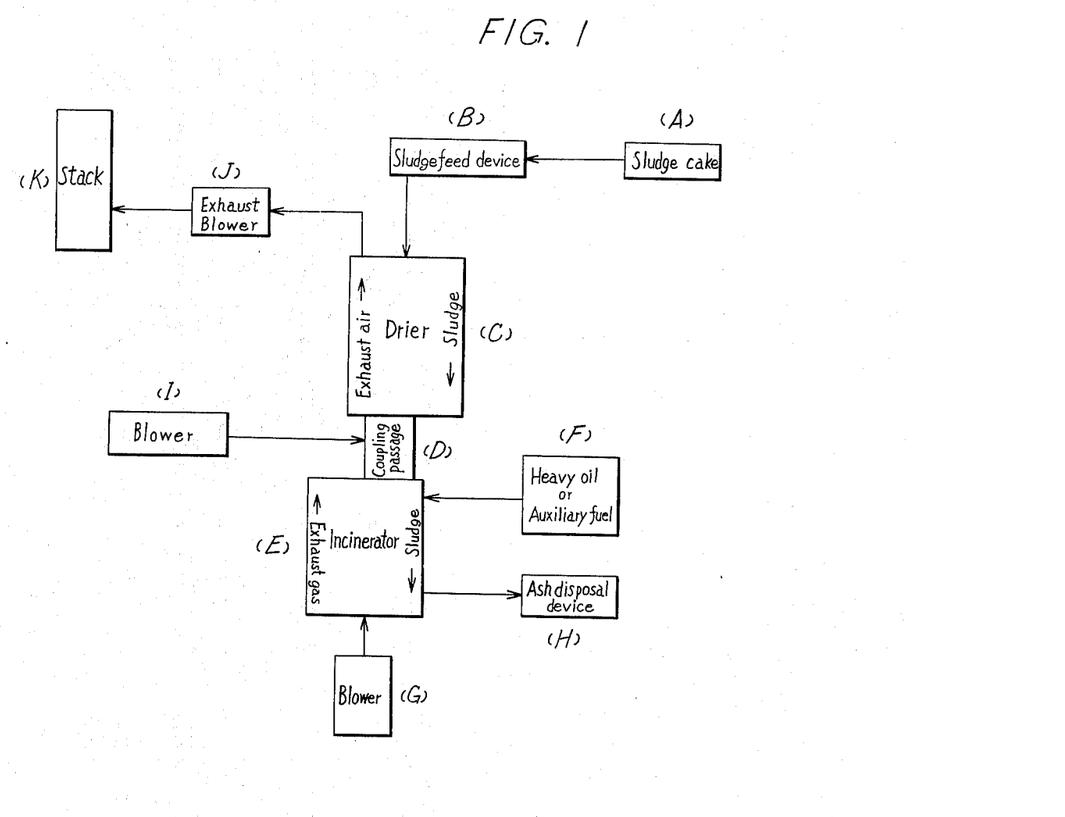
FIG. 1 is a diagrammatic view showing the operational steps of the process.
Figure 2:
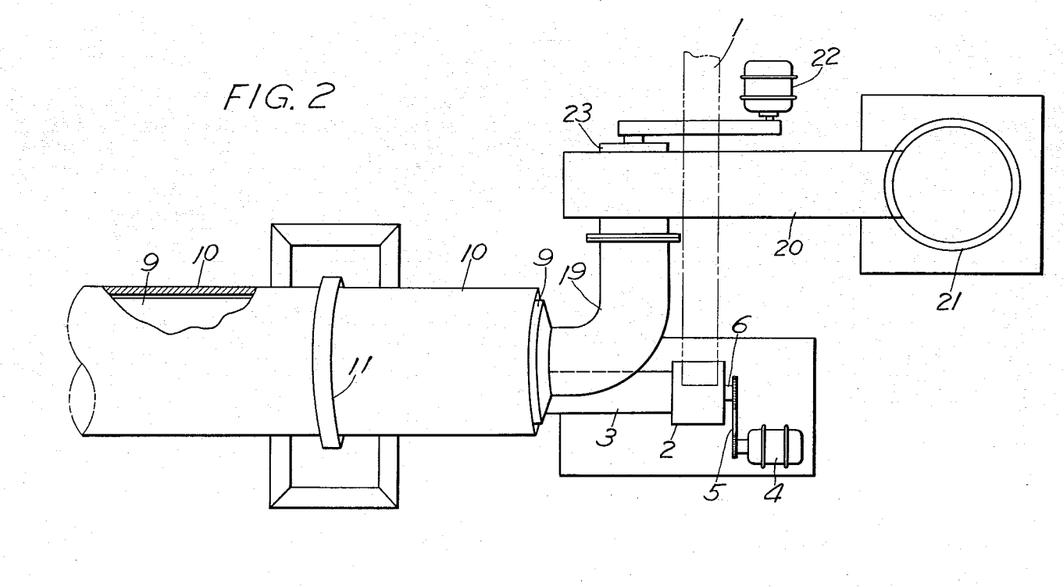
FIG. 2 is a plan view of the front half portion of a horizontal rotary multivane drier.
Figure 3:
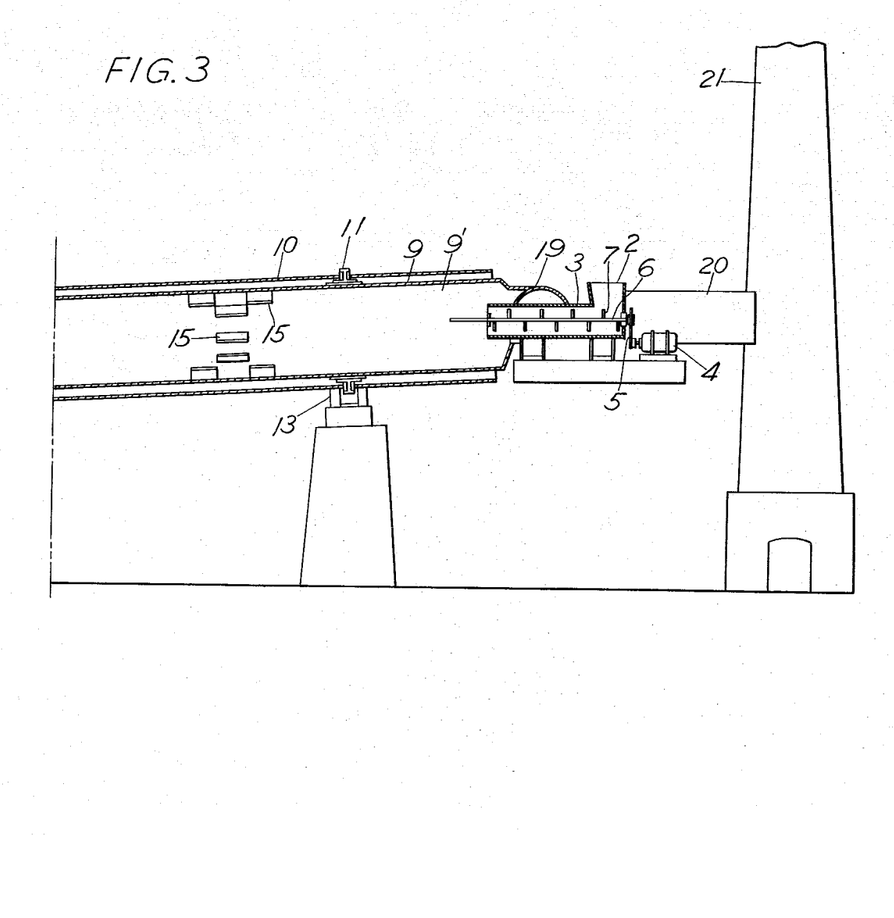
FIG. 3 is a side elevational view partly in cross section of the same portion.
Figure 4:
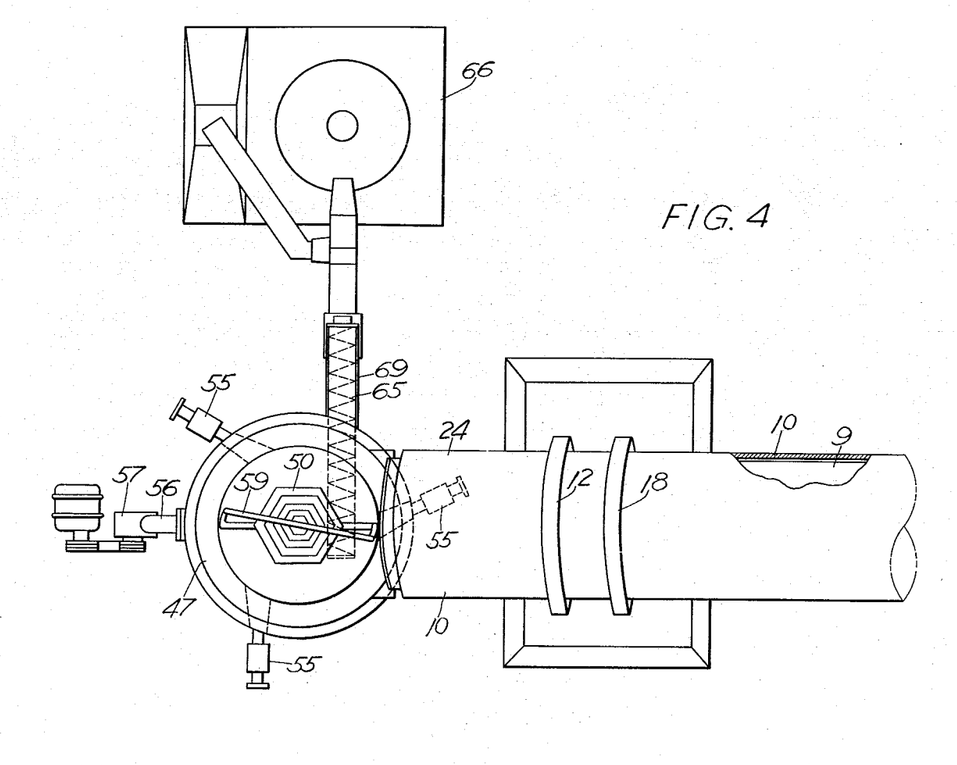
FIG. 4 is a plan view of the rear half portion of the same drier and an incinerator.
Figure 5:
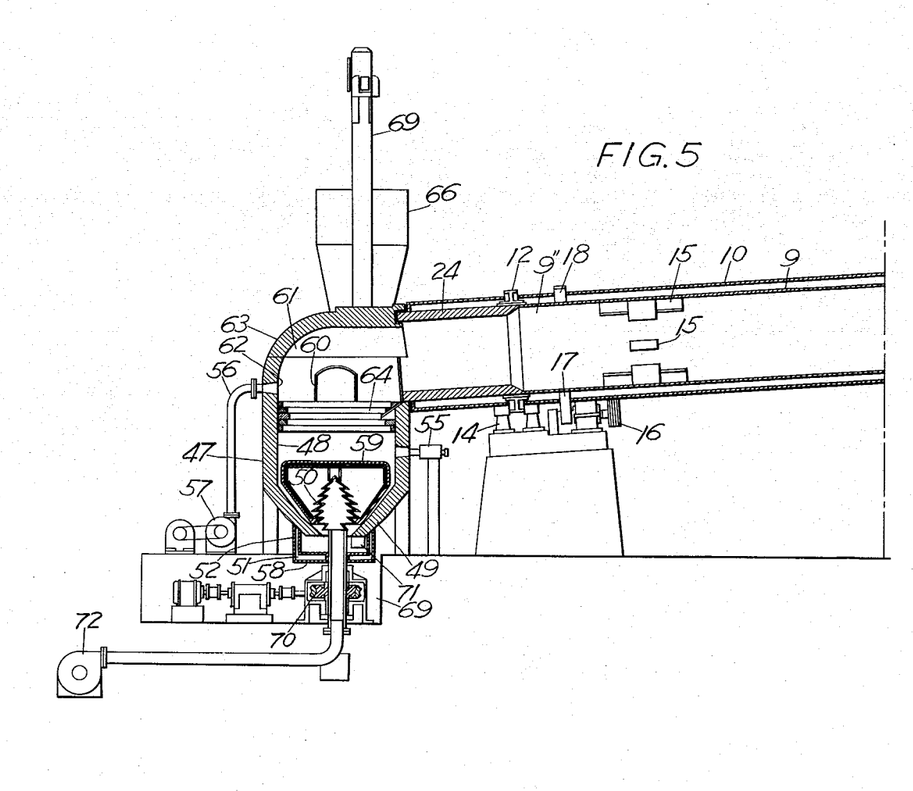
FIG. 5 is a side elevational view partly in cross section showing the rear half portion of the drier and the incinerator shown in FIG. 4.

FIG. 1 shows the operational process of the illustrative apparatus according to this invention. As shown in the drawing, sludge cake A is fed, by means of sludge feed device B, into a drier C, which may be either a horizontal rotary multivane drier (FIG. 2 to FIG. 5) or a vertical drier (FIG. 6 and FIG. 7) in accordance with the conditions of the place where the apparatus is to be installed. The temperature in the front portion of the drier is 200 to 300° C., and in the rear portion near the incinerator is 600 to 700° C. In the drier, the sludge cake is dried as it proceeds orderly towards a coupling passage D, through which it is fed into an incinerator E. In the incinerator the dried sludge burns by the help of heavy oil or auxiliary fuel F added to the sludge with air being supplied by a blower G, and the end product of the burning or ash is discharged into an ash pan or ash disposal device H.

The exhaust gas is passed through the coupling passage D into the drier C for the purpose of heating the inside of the drier to dry the sludge cake, and is then exhausted by means of an exhaust blower J into a stack K.

The following is a detailed explanation of the individual devices employed in the illustrative apparatus shown in the drawings.

Horizontal rotary multivane drier

This drier is shown in FIGS. 2–5, and FIGS. 4 and 5 include an incinerator combined with the drier.

A drier 9 is rotatably set at an angle of 3 to 5 degrees and is installed in a fixed cover 10. A sludge feed passage 3 and an exhaust port 19 are provided at higher front portion 9′, and at lower rear portion 9″ are a coupling passage 24 through which the dried sludge cake proceeds and a heat gas guide port. Water-containing sludge cake is fed from a sludge feed device including a conveyor 1 and a hopper 2 into the drier 9, and falls from the end of a coupling passage 24 into the incinerator. The exhaust gas from the incinerator is passed from said heat gas guide port through the drier and discharged from exhaust port 19 by an exhaust blower 22 through a flue 20 into the atmosphere.

The inside of this drier is surfaced with a heat insulating material such as refractory cement and the outside provided with the cover shell 10 spaced therefrom to provide an air jacket to prevent heat radiation and promote the heat insulating characteristics of the drier.

Furthermore, in order to raise the drying efficiency of the drier, the inside thereof is provided with a number of sludge-scraping vanes 15 preferably of iron plates or an anti-corrosion metal plate, which cause the sludge to fall from the upper side of the drier into the heated gas to facilitate the heat transfer by convection between the heated gas and the sludge for the rapid drying of the sludge. By repetition of the falling, globe-shaping of the sludge which is a defect of the drying by a rotary furnace can be prevented, and the drying can be accelerated.

The length and diameter of this drier differ according to the amount, moisture and nature of the sludge to be treated, but 30 to 90 minutes is necessary for the sludge to pass through the drier.

Vertical drier

Figure 6:
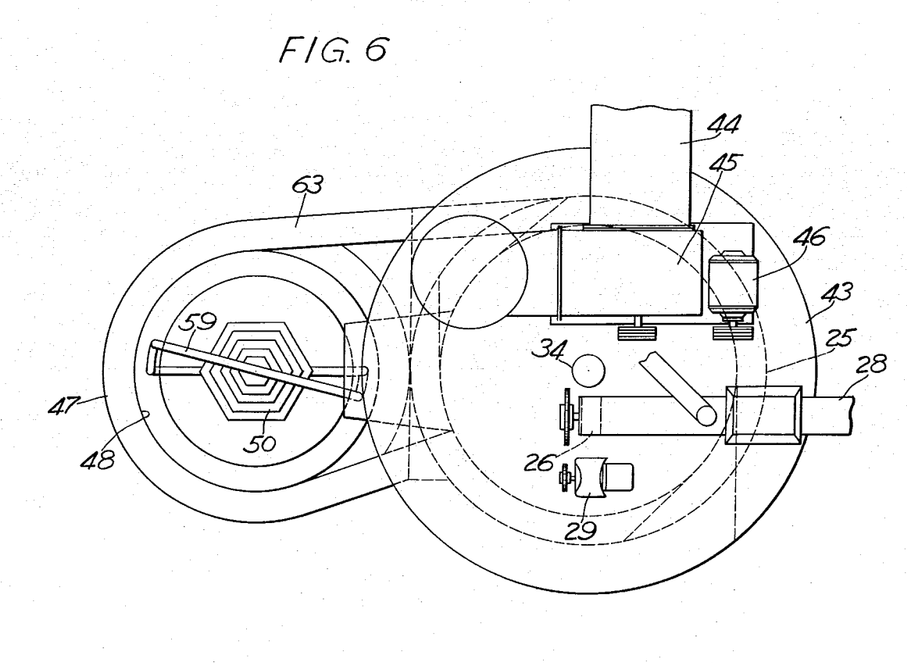
FIG. 6 is a plan view of a vertical drier.
Figure 7:
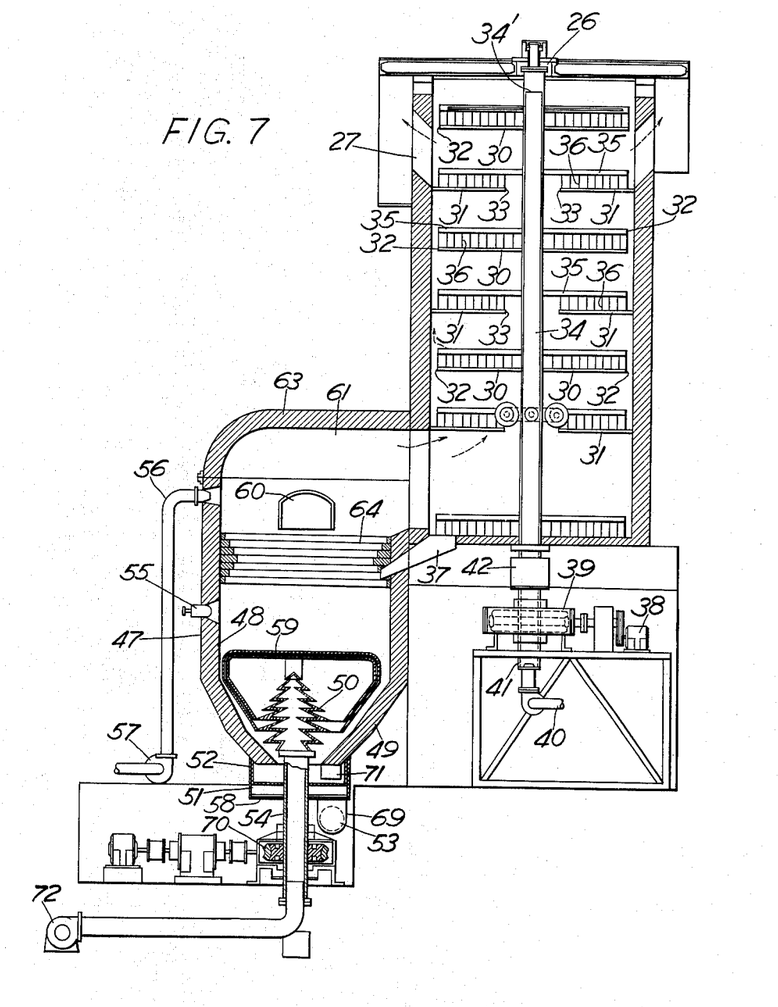
FIG. 7 is a side elevational view partly in cross section of the vertical drier.

The vertical drier 25 shown in FIGS. 6 and 7 has a sludge feed port 26 and an exhaust port 27 at its top, and several metallic drying shelves 30 and 31 in its interior. The shelves 30 and 31 are fixed to the inner wall and the outer iron wall of the drier respectively, with each shelf having its sludge fall gap 32 or 33 at its outer periphery or its central portion respectively. By virtue of stirrers 35 and 36 driven by a hollow shaft 34 extending axially of the center of the drier, the sludge on each shelf is stirred while being brushed toward the gaps 32 and 33, and the sludge on the lowest shelf is dropped from a dried sludge fall channel or chute 37 into an incinerator. The moisture of the dried sludge to be dropped is about 30%, but the surface of the sludge has a lower moisture content and is easily ignitable.

The vertical side wall and the bottom of the drier are made of heat insulating bricks and fire bricks to retain heat and prevent radiation loss.

The inside of the shaft 34 is cooled by air fed from a pipe 40 under the drier, and heated air produced by the air cooling is discharged from upper end 34' of the shaft onto the uppermost shelf and accelerates the drying of the surface of the sludge thereon having a high moisture so as to prevent the sludge from massing.

*Incinerator*

Figure 8:
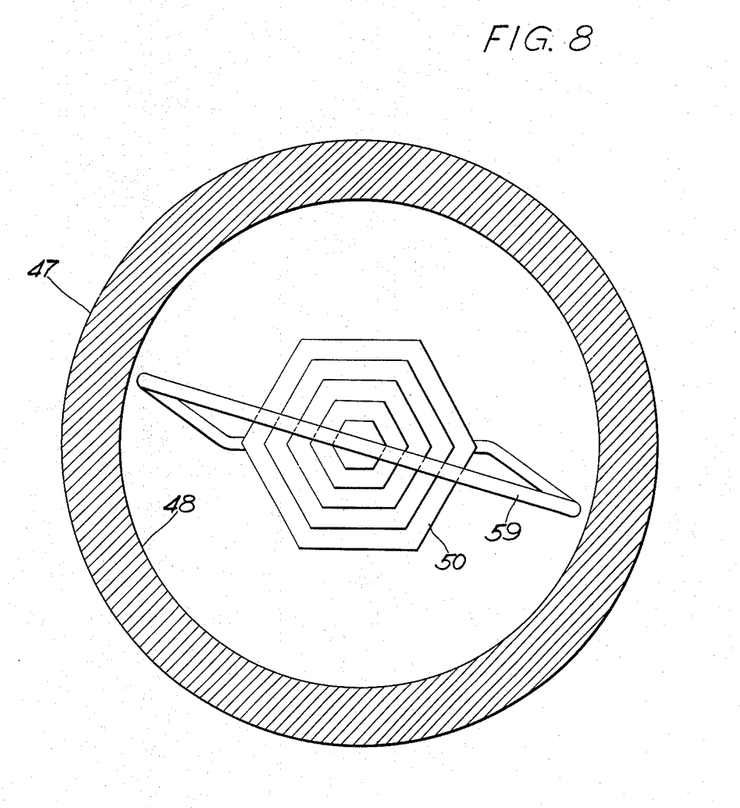
FIG. 8 is a partial plan view of the incinerator.
Figure 9:
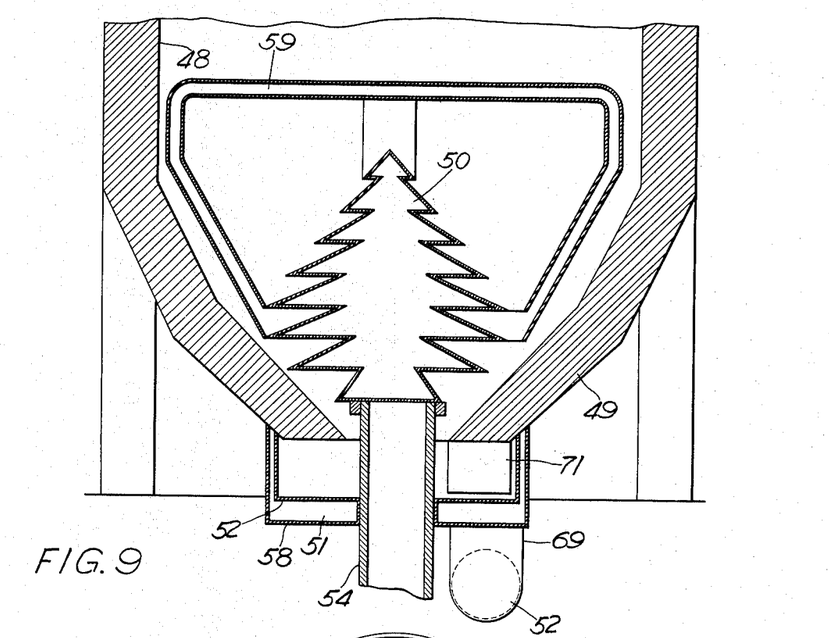
FIG. 9 is a sectional view of the main part of the incinerator.
Figure 10:
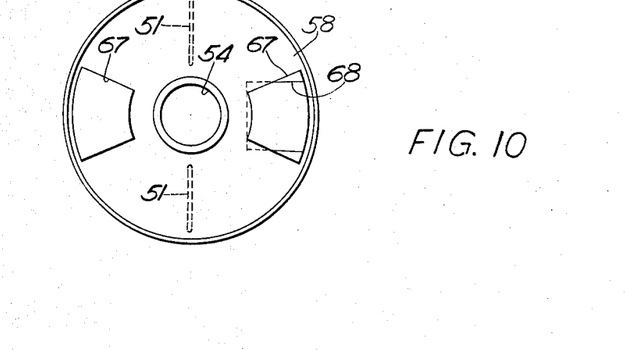
FIG. 10 is a bottom view of an ash receptacle at the bottom of the incinerator.

An incinerator 47 is shown in detail in FIGS. 7, 8 and 9, and comprises a cylindrical portion 48 and a truncated conical portion 49 fixed on the ground, with the interior thereof having a sludge-burning, air-blow-off, polygonal multi-umbrella type rotary hearth 50 eccentrically attached to a rotary blast pipe 54 to accelerate the burning of the sludge. There are provided at the bottom of the incinerator a rotary ash pan 52, a fixed ash pan 58 and a sludge-discharging screw conveyor means 53.

Several air-spraying low pressure heavy oil burners 55 are provided for the vertical side of the incinerator for ignition and auxiliary burning purposes. When heavy oil is burned, the burner 55 is in combined use as an auxiliary burner, while, when bark, wood meal, coal dust and the like are used as auxiliary fuels, an air supplying device 56 at the upper side of the incinerator is employed.

The inner wall of the incinerator is made by piling heat-insulating bricks or fire bricks, and on the rotary hearth there is fixed a stirrer 59 to stir the inside of the incinerator for accelerated burning.

A coupling flue 61 is provided on the top of the incinerator 47 and whose outer wall is of an iron plate and whose inner wall is made by piling heat-insulating bricks and fire bricks. A manhole 60 and an air hole 62 are provided in the wall. When the repair of the inside of the incinerator is necessary, a cover 63 can be upwardly removed to provide access thereto.

The operation will become more readily apparent from the following detailed description wherein heavy oil is employed as an auxiliary fuel and attention is called to FIGS. 2 to 5 and FIG. 9.

Initially, the entire apparatus is started and then the heavy oil burner 55 is ignited. After the exhaust temperature of the drier has reached 200° C., sludge cake is fed by the conveyor 1 into the sludge feed hopper 2, and falls through the feed passage 3 into the drier 9 while being stirred by the rotation of a pug mill rotary shaft 6 in the feed passage. The sludge cake is dried as it proceeds through the drier and reaches the outlet at the rear portion 9" of the drier after about 60 minutes. The dried sludge passes through the coupling passage 24, and falls into the incinerator in which the dried sludge is ignited by the flame of the heavy oil burner 55, and immediately reaches the multi-umbrella type rotary hearth 50, on which the sludge is burned as it falls toward the bottom of the incinerator into the rotary ash pan 52. Then, the ash on the pan is swept by a discharge vane 71 fixed under the lower end of the furnace wall towards openings 67 provided in the ash pan. The ash falls from the openings into the fixed ash pan 58 from which it is discharged by ash-scraping vanes 51 secured to the underside of the rotary ash pan 52 through a discharge passage 69 onto an ash conveyor 65 which carries the ash out of the incinerator into an ash collector or an ash-treatment device 66 to complete the disposal of the ash.

In the above-mentioned process, the temperature of the gas in the drier is about 700° C. at the inlet side and 150 to 200° C. at the outlet side, and the final average moisture of the dried sludge is below 30%. The temperatures in the incinerator and the coupling flue are adjusted below 1000° C. and at 700° C. respectively.

An automatic operation may easily be performed by coupling the measurement of the temperatures in the exhaust port of the drier and in the coupling flue by pyrometers with the adjustment of the heavy oil burner.

The shaft of the rotary hearth 50 is the blast pipe 54, and by securing the hearth eccentrically on the shaft, the stirring may effectively be performed. Moreover, the inner wall portion 64 of the incinerator above the hearth is narrowed at its middle for sufficient burning of the sludge.

In the present apparatus, the sludge feed device is always provided at the sludge inlet side of the drier. Usually, a stout pug mill is employed as the feed device, and, if particularly necessary, a feed device comprising a screw conveyor and a centrifugal swing-off device in combination is used.

The exhaust gas is always discharged by an exhaust blower in which the recommended static pressure is 70 to 80 mm. Hg in the case of the horizontal rotary multivane drier, and 120 to 130 mm. Hg in the case of the vertical multistep stirring drier in view of the resistance in the drier. The height of stack 21 may be selected according to the conditions of each factory, and the stack is not required to have its own ventilating characteristics.

As the blower for heavy oil combustion, a rotary blower or a turboblower is employed, and as the blower for the air required for the combustion of sludge or auxiliary fuels such as bark, wood meal, and coal dust, a multivane blower in which the blast pressure is below 100 mm. Hg is used.

Furthermore, a blower whose blast pressure is below 20 mm. Hg is employed for the temperature control of the exhaust gas to be fed into the drier.

When the sludge to be treated in the above-mentioned apparatus has 75% moisture and the fuel value of its dry sludge is over 2000 Kcal./kg., the sludge is able to keep itself burning without any auxiliary fuel. In addition to this economical advantage, no wide site is required for building the present apparatus, which can, therefore, be provided at a factory as a link of a modern waste-water treatment apparatus, and thus the promotion of the spread of waste-water treatment can be expected from the appearance of the apparatus according to the present invention.

The invention is not to be confined to any strict conformity to the showings in the drawings but changes or modifications may be made therein so long as such changes or modifications mark no material departure from the spirit and scope of the appended claims.

We claim:

1. A sludge drying and incineration apparatus for the treatment of industrial waste waters, comprising drier means into which sludge is fed for drying the same as it moves therethrough, an incinerator in communication with the drier means and into which the dried sludge is deposited, said incinerator including wall means having at least the inner surface thereof defined by heat insulating material, a rotary polygonal multi-umbrella type hearth mounted within the wall means, oil burner means in the wall means above the rotary hearth, and ash receiving means below the rotary hearth, the arrangement being such that the dried sludge cake upon being deposited into the wall means is ignited by the oil burner means and is burned on the rotary hearth after which the ash falls into the ash receiving means.

2. The sludge drying and incineration apparatus as claimed in claim 1 in which said ash receiving means includes a rotatable pan, a fixed pan below and coaxially arranged with respect to the rotatable pan, said rotatable pan having openings for providing communication to the fixed pan, vane means cooperable with the rotatable pan for moving the ashes in the rotatable pan through the openings and into the fixed pan, and means cooperable with the fixed pan for conveying the ashes to a point remote from the incinerator.

3. The sludge drying and incineration apparatus as claimed in claim 1, including a rotatable blast pipe extending into said wall means with said rotary hearth being attached to said pipe.

4. The sludge drying and incineration apparatus as claimed in claim 3 in which said rotary hearth is eccentrically attached to said pipe.

5. The sludge drying and incineration apparatus as claimed in claim 4 in which said drier means is defined by a horizontal rotary drum.

6. The sludge drying and incineration apparatus as claimed in claim 4 in which said drier means is defined by a vertical multi-step stirrer drier.

References Cited by the Examiner
UNITED STATES PATENTS

| | | |
|---|---|---|
| 1,105,688 | 8/1914 | Paffrath. |
| 2,104,040 | 1/1938 | Hurt _______________ 110—14 |
| 2,505,363 | 4/1950 | Nichols _____________ 110—15 |

FREDERICK L. MATTESON, Jr., *Primary Examiner.*

JAMES W. WESTHAVER, *Examiner.*